US006496929B2

(12) United States Patent
Lenstra

(10) Patent No.: US 6,496,929 B2
(45) Date of Patent: Dec. 17, 2002

(54) GENERATING RSA MODULI INCLUDING A PREDETERMINED PORTION

(75) Inventor: Arjen K. Lenstra, Basking Ridge, NJ (US)

(73) Assignee: Citibank, NA, New York, NY (US)

( * ) Notice: Subject to any disclaimer, the term of this patent is extended or adjusted under 35 U.S.C. 154(b) by 0 days.

(21) Appl. No.: 10/120,454

(22) Filed: Apr. 12, 2002

(65) Prior Publication Data

US 2002/0154768 A1 Oct. 24, 2002

Related U.S. Application Data

(63) Continuation of application No. 09/057,176, filed on Apr. 8, 1998, now Pat. No. 6,404,890.

(51) Int. Cl.$^7$ ................................................. G06F 1/24
(52) U.S. Cl. ........................ 713/161; 713/168; 380/268
(58) Field of Search ................................ 713/161, 168, 713/200, 201; 380/268, 28

(56) References Cited

PUBLICATIONS

R.L. Rivest, et al., "A Method for Obtaining Digital Signatures and Public–Key Cryptosystems", *Communications of the ACM*, vol. 21, No. 2, pp. 120–126, 1978.
A.K. Lenstra and H.W. Lenstra, Jr., "Algorithms in Number Theory", *Handbook Of Theoretical Computer Science*, pp. 675–715, 1990.
S.A. Vanstone and Robert J. Zuccherato, "Short RSA Keys and Their Generation", *Journal of Cryptology*, vol. 8, pp. 101–114, 1995.
D. Coppersmith, "Finding a Small Root of a Bivariate Integer Equation; Factoring with High Bits Known", *EUROCRYPT '96 Proceedings, LNCS 1070*, pp. 178–189, Springer–Verlag Berlin Heidelberg 1996.
U. M. Maurer, "Fast Generation of Prime Numbers and Secure Public–Key Cryptographic Parameters", *Journal of Cryptology*, vol. 8, pp. 123–155, 1995.

P. L. Montgomery, "Modular Multiplication Without Trial Division", *Mathematics Of Computation*, vol. 44, No. 170, pp. 519–521, 1985.
Robert D. Silverman, "Fast Generation of Random, Strong RSA Primes", *RSA Laboratories' CryptoBytes*, vol. 3, No. 1, pp. 9–13, Spring 1997.
"Information Technology—Open Systems Interconnection—The Directory: Authentication Framework", *ITU–T Recommendation X–509, ISO/IEC 9594–8: 1995(E)*, pp. 1–35, 1995.
A. Young and M. Yung, "The Dark Side of "Black–Box" Cryptography or: Should We Trust Capstone?", *Advances in Cryptology—Crypto '96*, Neal Koblitz (Ed.), lecture notes in Computer Science, vol. 1109, pp. 89–103, 1996.
Vanstone, S. A., et al., "Using Four–Prime RSA In Which Some of The Bits Are Specified", *Electronics Letters*, vol. 30, No. 25, pp. 2118–2119, Dec. 8, 1994.
Guillou, Davio and Quisquater, "Public Key Techniques: Randomness and Redundancy", Cryptologia, 1989, pp. 167–182.
Guillou and Quisquarter, "Precautions Taken against Various Potential Attacks", Eurocrypt '90, Springer 1990, pp. 465–473.
Arjen K. Lenstra, "Generating RSA Moduli with a Predetermined Portion," ASIACRYPT '98, Oct. 18–22, 1998; pp. 1–10.

*Primary Examiner*—Thomas R. Peeso
(74) *Attorney, Agent, or Firm*—Morgan & Finnegan, LLP

(57) ABSTRACT

Techniques are provided for generation of an RSA modulus having a predetermined portion. The predetermined portion may be the leading digits of the modulus, or split between the leading and trailing digits of the modulus. The resulting RSA modulus has the same security level as conventional RSA moduli, but requires less storage space. Significant performance improvements may be obtained for encryption, decryption, digital signature generation and digital signature verification when using RSA moduli in a specifically chosen format, as the division portion of a modulo operation is accomplished using only multiplication operations, and without using division operations.

82 Claims, 12 Drawing Sheets

INPUT

S=10000000000000000000000000000000000000000000000000000000000000000000000000000000000000000000000000000000000000000000000000000000000000000000000000000000000000000000001

OUTPUT

INPUT

S=100000000000000000000000000000000000000000000000000000000000000000000000000000000000000000000000000000000000000000000000000000000000000000000000000000000000000000000000001

OUTPUT    P=9612993143900880619578768927592102358065872998133019870643777610603313324485238328278983177430928936043771208877761319999559035367034551666593205622352969 q=1040258725904185436334625362398865643088301100287372381009222722760021609551047226003215627403963318969168316320323828440090437757646450662900819749052431 29 n=10000000000000000000000000000000000000000000000000000000000000000000000000000000000000000000000000000000000000000000000000000000136953663090378893999299190931849167747617772894062924007312432290845422361669197393395548103661933795732447977779513936796335290820378022433411538040815794100000000000000000000000000000000000000000000000000000000000000000000001

FIG. 8

```
INPUT (with s in radix d representation):
d = 40
s = 12 28 15 24 14 11 10 26 25 23 15 28 11 24 13 15 38 10 23 25 28 17 11
    24 10 16 19 24 24 15 17 11 24 10 22 37 22 37 26 37 10 03 04 05 10 26
    11 28 21 10 11 32 15 24 31 15 10 24 15 33 10 35 25 28 21 10 24 35 10
    01 00 01 05 04 39 00 00 05 03
L = 79
K = 165

OUTPUT (in radix d representation):
p = 09 05 14 32 18 35 20 33 10 00 02 30 10 02 24 33 02 08 29 14 20 16 09
    21 01 11 32 36 09 38 34 33 30 05 35 17 13 05 06 09 30 04 10 19 10 34
    19 29 20 38 24 37 30 05 29 36 04 28 20 33 34 28 27 28 24 24 21 28 06
    39 00 02 28 22 27 14 05 12 21 32 04 01 31
q = 01 15 26 12 02 02 06 04 32 15 30 36 29 33 15 30 35 04 18 36 05 39 38
    29 36 24 10 13 06 37 02 28 05 05 30 22 29 25 36 17 25 12 05 37 15 17
    00 14 11 30 26 23 04 27 19 12 02 03 37 12 22 25 27 01 33 21 03 18 28
    30 08 09 26 08 32 37 02 08 10 08 15 27 03
n = 12 28 15 24 14 11 10 26 25 23 15 28 11 24 13 15 38 10 23 25 28 17 11
    24 10 16 19 24 24 15 17 11 24 10 22 37 22 37 26 37 10 03 04 05 10 26
    11 28 21 10 11 32 15 24 31 15 10 24 15 33 10 35 25 28 21 10 24 35 10
    01 00 01 05 04 39 00 00 05 03 14 23 38 18 10 28 26 20 22 07 15 03 14
    19 32 06 02 25 26 19 16 15 26 00 22 03 06 32 29 10 18 06 25 13 19 11
    17 04 30 06 04 28 20 05 32 03 12 21 17 23 28 25 39 10 39 26 16 10 14
    35 00 28 13 09 05 20 28 23 13 16 14 21 09 28 18 35 39 24 12 15 05 37
    00 05 02 13
```

FIG. 7

INPUT (with s1 and s2 in radix d representation):

d = 16
s1 = AAAAAAAA AAAAAAAA AAAABBBB BBBBBBBB BBBBBBBB CCCCCCCC CCCCCCCC
     CCCC
s2 = DDDDDDDD DDDDDDDD DDDDEEEE EEEEEEEE EEEEEEEE FFFFFFFF FFFFFFFF
     FFFF
L = 60

OUTPUT (in radix d representation):

p = 1DAEE435 B14C8767 3B7EE686 633BDFF8 41D4899D A2FF0271 77D5030E
    1302224A 2B0546D3 359D880E CF256B75 323B045B 59E089F6 66AC299B
    465B2930 4A85
q = 5BFE67AA A76A2DF0 0FBEB27C C98A9A67 FB68CB4F 7A8B4044 6F4D7589
    D6813A3F 2581176C 3E4E6279 18E43585 ABF4CF10 A745BF5D 91ABB7AA
    E68326BD 9E1B3
n = AAAAAAAA AAAAAAAA AAAABBBB BBBBBBBB BBBBBBBB CCCCCCCC CCCCCCCC
    CCCC16B8 7625A88F A68D8751 960FB303 C99EF5DB A891D201 AE0779B7
    DDED1EC4 07B772D6 8806FDDC 21F96B02 5EB62807 82736D51 F1AD846F
    DE9B56CD D92514D6 3EE7DDDD DDDDDDDD DDDDDDDD EEEEEEEE EEEEEEEE
    EEEEFFFF FFFFFFFF FFFFFFFF

p=272534114637709211364088957833344221452224112613877044654397435765685980537660500852649327851092570831890915179860209566823984372393034865977203913 1577 q=412263327393907915859580595371234130147411801971606363688590193044391749662935725910185175519428524428139432622251708325047622558956844069165661605402696 6557 n=112355820928894744233081574424314045851123561183894160795893800723582922378438101957942798326504710013200071174919620848536743605509010389058029644149671326130661980723127229325557339029253012899028946307941609422328966441967180355281042541268032151327873853646240885991889008935618346849802928374059016703 89 x=160544295266741369897213154822152579592562923053711151918319487773449685894564015315281998487189922020215531625550408078019775931475840719169331956123381 87 where $n = 2^{1020} - x$. Hexadecimal representation of n:

FFFFFFFF FFFFFFFF FFFFFFFF FFFFFFFF FFFFFFFF FFFFFFFF FFFFFFFF
FFFFFFFF FFFFFFFF FFFFFFFF FFFFFFFF FFFFFFFF FFFFFFFF FFFFFFFF
FFFFFFFF FFFFFFFF CEF469CD DEFC1AD2 3C8AD46F 69C710AB 3DCF816E
793108AC 2DDE449E 1A3D1C96 58D79810 C741C722 A152979D C1727B4A
F97B38A7 EFD2A62E 67544A57 C0747F5

p=27880945940176153355063143974967617470016130980106851134210477325
9178289193879351873881782722267410614787372039150179528655223743
90626734698250537047560607831903107638321043634391298800226598964
50656241467636184647555510032983073945304976013629224373801415789
599194639949196124600814686905252799485818711 q=4527762624586941890938116098653859904230712290274294696545819517
76527675341190875481205718539144507202235904573441126903227277881
14725234131465255297399630481964335247295026593979859994050970488
50975160551808946445577103253307433800781187420284869621172680614
46879153075466297401924699041548567130557067178929663 n=12623830496605862226841748706511699984548477605357610950050916182
62681841362026988015515680137613807175340545348511641386489045279
31605160527688095259563605939964364716019515983399209962459578542
17210014993776393858121960407273342250718005600967254090070955410
95168165737795933263322883148732515590778530684437298760843184891
57874404458604442014382541798899341369786841262109086280288144552
52593788237732110788701687707765659160297493193585115412490492139
45502934356543767724444815186090583614332243543239388709801047100
62486094224770624302732583658671974187636294581382541084907733687
555958795643944826784596224393 x=12479887190734734229262783014134075748993958390941041695795870946
52734784979278549623509745998370754323700324947585038700143627252
82715018917202240714223481132658293345715992562983656718760112797
94929359755855162462873326047332766277796811522536765404330901260
153512058238041619494635533237132726383605323383 where n = $2^{2040}$ − x. Hexadecimal representation of n:

| | | | | | | |
|---|---|---|---|---|---|---|
| FFFFFFFF | FFFFFFFF | FFFFFFFF | FFFFFFFF | FFFFFFFF | FFFFFFFF | FFFFFFFF |
| FFFFFFFF | FFFFFFFF | FFFFFFFF | FFFFFFFF | FFFFFFFF | FFFFFFFF | FFFFFFFF |
| FFFFFFFF | FFFFFFFF | FFFFFFFF | FFFFFFFF | FFFFFFFF | FFFFFFFF | FFFFFFFF |
| FFFFFFFF | FFFFFFFF | FFFFFFFF | FFFFFFFF | FFFFFFFF | FFFFFFFF | FFFFFFFF |
| FFFFFFFF | FFFFFFFF | FFFFFFFF | FFFFFFFE | 3909C0D2 | EFA39FFC | C10F9DD8 |
| 2F9285A8 | F825E102 | 94449C26 | FB9B4E57 | 16AAEF26 | 472D4072 | 757C2C34 |
| 8C5A3E16 | F9B45A51 | 5870998D | DDFEC0EE | 8BDE420B | FA5F86F2 | AFC600C0 |
| C5C2B715 | EFAB3DC7 | 7FDA4207 | D148DC3F | 0AFE8660 | E4AB43F6 | 26A34A09 |
| F7600384 | 21AD4CA9 | 814B1B8B | 9882A939 | A2B1A2E8 | 47C93737 | 6EC9EB67 |
| 2DE989 | | | | | | |

FIG. 11

GENERATING RSA MODULI INCLUDING A PREDETERMINED PORTION

This is continuation of application Ser. No. 09/057,176, filed Apr. 8, 1998 now U.S. Pat. No. 6,404,890.

BACKGROUND OF THE INVENTION

The present invention relates to cryptography, and, more particularly, is directed to generation of a modulus, part of a public key according to the Rivest-Shamir-Adleman (RSA) cryptographic scheme, wherein the modulus is generated so as to have a predetermined portion.

The RSA scheme is described more fully in U.S. Pat. No. 4,405,829 (Rivest et al.), "Cryptographic Communications System and Method", the disclosure of which is hereby incorporated by reference. In a set-up phase of the RSA scheme, a participant picks two prime numbers, p and q, each having a selected number of bits, such as 512 bits, with $p \neq q$. The participant keeps p and q secret. The participant computes an RSA modulus n, with n=p*q. When p and q each have 512 bits, n has 1023 or 1024 bits. The participant picks an RSA exponent e that has no factors in common with (p-1)(q-1). For efficiency purposes, the RSA exponent e is often chosen of much shorter length than the RSA modulus. When the RSA modulus n has 1024 bits, the RSA exponent e typically has at most 64 bits. The owning participant makes the public key (n, e) available to other participants.

During operational use of the RSA scheme, other participants use the public key (n, e) to encrypt messages for the participant which owns that key. The owning participant is able to decrypt messages encrypted with the public key (n, e) due to possession of the secret prime numbers p and q.

Participants must store not only the public key of other participants, but also identifying information such as the name, address, account number and so on of the participant owning each stored public key. There are problems with this situation.

One problem with the present technique for using the RSA encryption scheme is that, although the RSA modulus n is 1024 bits, the amount of security provided actually corresponds to only 512 bits, since an attacker who knows one of p and q can readily obtain the other of p and q. Instead of having to store 1024 bits to obtain 512 truly secure bits, it is desirable to store far fewer bits, such as approximately 512 bits, to obtain the 512 truly secure bits.

Another problem with the present technique is the additional storage required for the identifying information. It is desirable to reduce the amount of additional storage as much as possible.

Generating RSA moduli having a predetermined portion has been considered by Scott A. Vanstone and Robert J. Zuccherato in "Short RSA Keys and Their Generation", *J. Cryptology*, 1995, volume 8, pages 101–114, the disclosure of which is hereby incorporated by reference.

In "Finding a Small Root of a Bivariate Integer Equation; Factoring with High Bits Known", U. Maurer ed., EUROCRYPT '96 Proceedings, pages 178–189, Springer Verlag 1996, the disclosure of which is hereby incorporated by reference, Don Coppersmith has analyzed the security of the Vanstone methods, and found that all but one of Vanstone's methods provide inadequate security. Specifically, for the Vanstone methods having predetermined high order bits, the RSA modulus n is generated in such a way that somewhat more than the high order $((\frac{1}{4})\log_2 n)$ bits of p are revealed to the public, which enables discovery of the factorization of the RSA modulus n, thus leaving the scheme vulnerable to attack.

SUMMARY OF THE INVENTION

In accordance with an aspect of this invention, there is provided a method of determining an RSA modulus having a predetermined leading portion s and first and second prime p and q. A number is selected as the first factor p. A number n having the predetermined leading portion s is set. The factor q is obtained as n/p.

If the factor q is prime, then the number n is the desired RSA modulus. If the factor q is not prime, then q is adjusted and the adjusted q is checked to determine whether it is prime.

According to a further aspect of the invention, the step of adjusting the factor q may be performed by incrementing or decrementing the factor q by a predetermined amount, and may further include correspondingly incrementing or decrementing the number n by the product of the predetermined amount and the number p.

In accordance with another aspect of this invention, there is provided a method of determining an RSA modulus having a predetermined leading portion s1 and predetermined trailing portion s2, and first and second factors p and q. A number is selected as p. A number n having the predetermined leading portion s1 and predetermined trailing portion s2 is set. The factor q is obtained as n/p.

If the factor q is prime, then the number n is the desired RSA modulus. If the factor q is not prime, then q is adjusted, and the adjusted q is checked to determine whether it is a prime number.

In accordance with a further aspect of this invention, there is provided a method of determining an RSA modulus having a predetermined leading portion s1 and a predetermined trailing portion s2, and first and second prime factors p and q. A number is selected as one of p1 and q1. A number n1 is set, the number n1 having the predetermined leading portion s1 and a trailing portion which is a function of the selected one of p1 and q1. The other of p1 and q1 is obtained as the number n1 divided by the selected one of p1 and q1.

A number is selected as one of p2 and q2. The other of p2 and q2 is obtained as the predetermined trailing portion s2 divided by the selected one of p2 and q2.

The numbers p1 and p2 are concatenated to produce the factor p, and the numbers q1 and q2 are concatenated to produce the factor q.

If each of the factors p and q are prime, then the desired RSA modulus is the product of the factors p and q. If at least one of the factors p and q is not prime, new numbers are obtained for p2 and q2, concatenated with p1 and q1, respectively, to produce the revised factors p and q, and it is checked whether the revised factors p and q are prime numbers.

In accordance with another aspect of this invention, there is provided a method of encrypting a message a using a public exponent b and an RSA modulus n, comprising performing a multiplication portion of obtaining $a^b$ mod n, and performing a division portion of obtaining $a^b$ mod n using only multiplication operations and without using division operations.

Corresponding methods of decrypting a message a using a secret exponent b and an RSA modulus n, signing a message a using a secret exponent b and an RSA modulus n, and verifying a signature a using a public exponent b and an RSA modulus n are also provided.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 6–9 are examples of RSA moduli generated according to the present invention;

FIGS. 10 and 11 depict moduli used in examples illustrating the increase in speed that can be obtained by using RSA moduli that are close to a power of the radix.

DETAILED DESCRIPTION OF THE PREFERRED EMBODIMENTS

The present invention recognizes that a portion of the RSA modulus n may be predetermined. Let [x] denote the largest integer not greater than x. A K-bit RSA modulus according to the present invention contains a predetermined portion in either the most significant $[K/2-\ln(K/2)]$ bits, or spread between the most significant and least significant bits, such as the most significant $[(K/2-\ln(K/2))/2]$ bits and the least significant $[(K/2-\ln(K/2))/2]$ bits, so that the security of the resulting RSA key is not compromised. If the predetermined portion is a pattern, such as the digits 1 0 0 0 . . . 0 0 1, and all participants use this pattern in their public keys, then only its length need be stored as there is no information in this pattern. Therefore, the length of the stored portion per participant is reduced, overcoming the prior art disadvantage of storing a large number of bits relative to the number of truly secure bits provided by the public key.

If the predetermined portion contains information identifying the participant, such as the RSA exponent, then it must be stored, but the accompanying storage which would normally have been used to store the identifying information is not required, thereby overcoming the prior art problem of large required storage. In this case, it is still the situation that only approximately 512 bits of the 1024 key bits are the bits that provide security, because the 512 identifying information bits are predictable functions of a participant's name and other personal data.

Both methods have the advantages of requiring only 512 bits of storage for 512 bits of security, plus a trivial amount of overhead, and no need for additional storage of identifying information.

Another use for the present invention is in simplifying creation of unique keys. In conventional key generation, there is a possibility, albeit small, that two participants may have the same keys due to the random number process involved in key generation. Consequently, to ensure uniqueness of keys generated in a conventional manner, a database of previously generated keys must be maintained and each newly generated key must be checked against the database for uniqueness. With the present invention, there are several ways to guarantee unique keys. In one technique, a centralized key generation facility sets the predetermined digits to a value heretofore unused. In another technique, each of a plurality of key generation facilities is assigned a respective range of values for the predetermined digits and uses its own scheme for ensuring unique keys within its assigned range.

Importantly, techniques according to the present invention for finding secret numbers p, q to produce the desired RSA modulus n are quite simple, making the RSA modulus generation technique robust.

It will be understood that the number of bits is given merely for example, and that the present invention does not depend on a particular total length of bits.

Figure 1A:
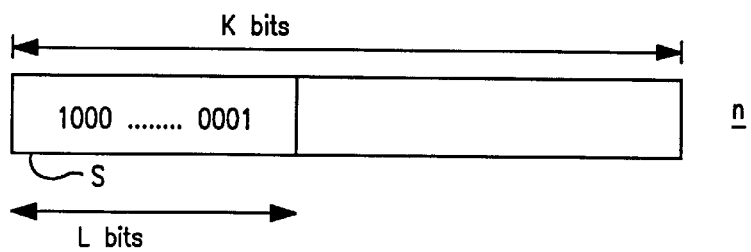
FIG. 1A is a block diagram of an RSA modulus n of K bits having a predetermined portion s of L most significant bits.
Figure 1B:
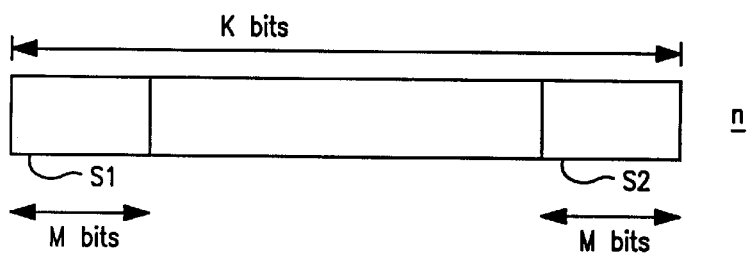
FIG. 1B is a block diagram of an RSA modulus n of K bits having two predetermined portions s1 and s2, each of M bits.
Figure 1C:
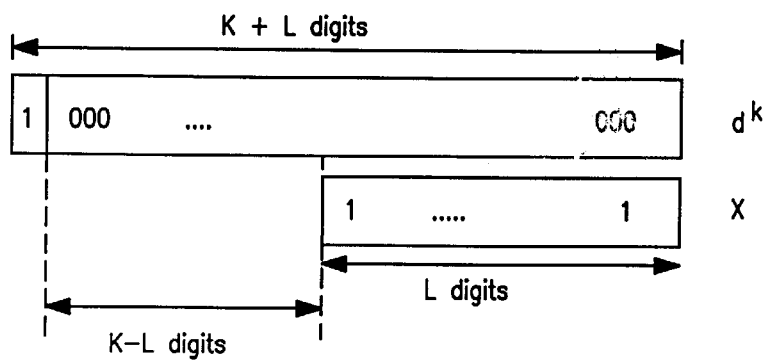
FIG. 1C is a block diagram referred to in explaining special arithmetic according to the present invention.

Using the methods according to the present invention, RSA moduli of the form $d^M-x$ can be generated, where x has substantially fewer than M radix d digits, as depicted in FIG. 1C. For example, d=10, M=6 and x=32 represents a modulus $10^6-32=999,968$; it will be understood that a practical modulus has many more digits than this example. On most computers, d=2 for fast arithmetic, so a digit is the same as a bit, and these terms are used interchangeably below. Arithmetic operations modulo such RSA moduli can be carried out very efficiently because divisions can be entirely avoided, as explained in detail below. This leads to faster encryption and cryptographic signature runtimes, in addition to saving bits for storage and transmission.

FIG. 1A shows an RSA modulus n having K bits, and including a predetermined leading portion s having L bits. The predetermined portion is shown as being a pattern consisting of an initial and final "1" and all intermediate "0" values. The predetermined portion may, however, be chosen as any series of 0 and 1 bits.

Figure 2:
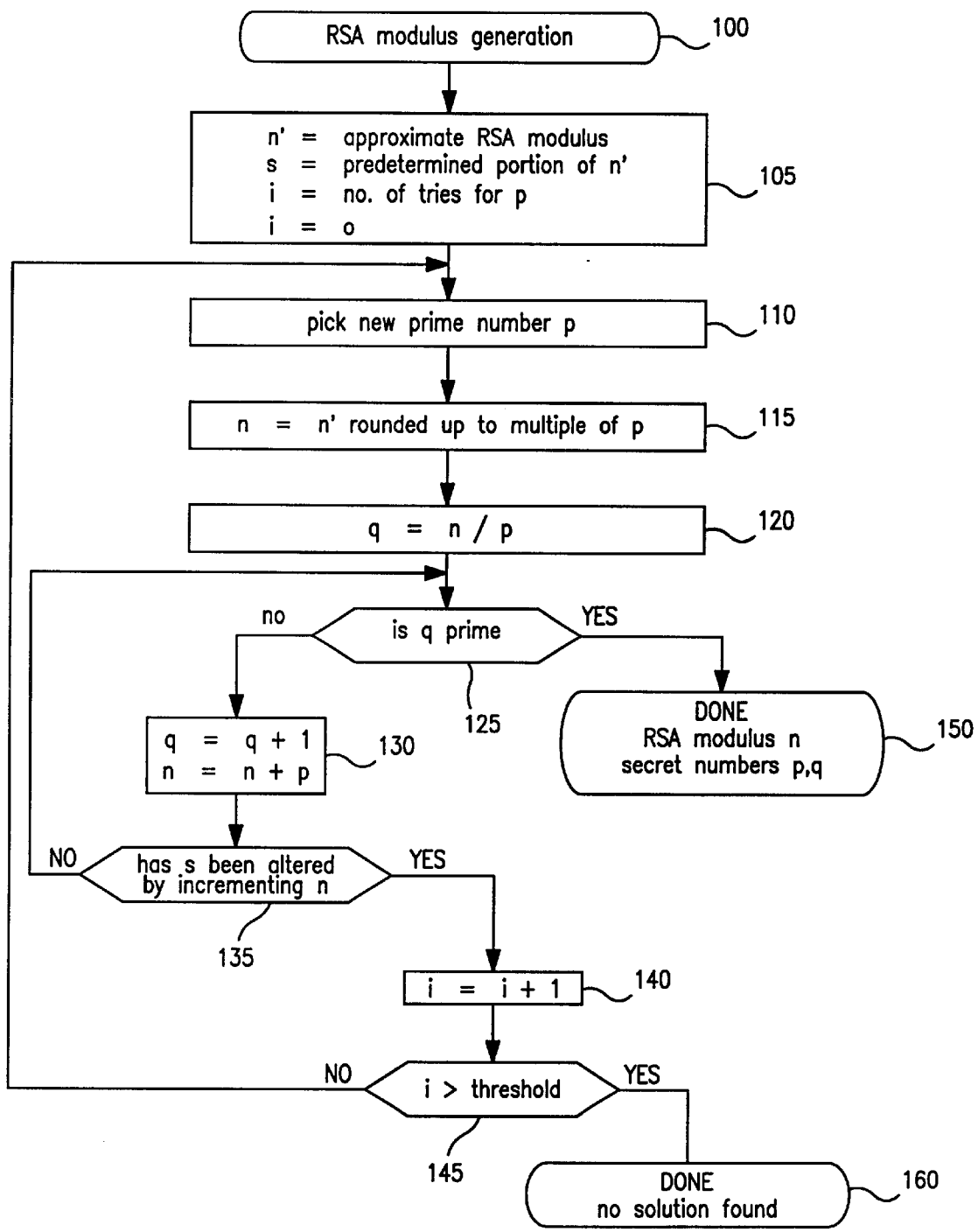
FIGS. 2–5 are flowcharts respectively illustrating an RSA modulus generation technique according to the present invention.

FIG. 2 is a flowchart illustrating a technique for generating the RSA modulus n shown in FIG. 1A according to the present invention, with $L=[K/2-\ln(K/2)]$.

In the method of FIG. 2, let $n'=s*2^{K/2+k}$ for an even positive integer K of k+1 bits. Find a random prime p of K/2 bits. Round n' up to the nearest multiple of p. Let $q'=n'/p$. Find the smallest non-negative m such that $q=q'+m$ is prime. If m>K/2, start over. Otherwise, let $n=n'+mp=p(q'+m)=pq$, and $s=[n/2^{K/2+k}]$. Although m is not explicitly shown in FIG. 2, it is implicitly present as the number of times step 130 is performed.

At step 105, a number n' is chosen having K bits, including a predetermined leading portion s having $[K/2-\ln(K/2)]$ bits, and a to-be-determined trailing portion having $K-[K/2-\ln(K/2)]$ bits. A counter i for the number of attempts at finding a suitable solution for the value of p is initialized to a value of zero. At step 110, a prime number p having K/2 bits is chosen. The prime number p may be selected arbitrarily, or may be selected by the method proposed by Ueli M. Maurer in "Fast Generation of Prime Numbers and Secure Public-Key Cryptographic Parameters", *J. Cryptology*, 1995, volume 8, pages 123–155, the disclosure of which is hereby incorporated by reference.

At step 115, the chosen number n' is rounded up to the nearest multiple of p, resulting in a rounded number n. At step 120, the value of a desired prime number q is set to n/p. That is, step 115 forces n to be an integer multiple of p.

At step 125, it is determined whether the desired prime number q is, in fact, a prime number. This determination may be performed in any convenient manner. For example, the determination of whether q is a prime number may be according to a probabilistic compositeness test, as set forth in A. K. Lenstra and H. W. Lenstra, Jr., "Algorithms in Number Theory" in *Handbook of Theoretical Computer Science*, J. van Leeuwen ed., pages 675–677 and 706–715, Elsevier Science 1990, the disclosure of which is hereby incorporated by reference. It is recognized that a probabilistic compositeness test has a small chance of determining that a number is prime when actually it is not prime, that is, generating a false positive result. However, the probabilistic compositeness test is also used in the conventional RSA key generation technique, as explained in U.S. Pat. No. 4,405,829, so use of a probabilistic compositeness test in the present invention does not introduce risks beyond those present in the conventional RSA key generation technique. Furthermore, both in the present invention and in the conventional RSA key generation technique, the resulting primes can be subjected to a deterministic primality test, if so desired, thereby giving a mathematical proof of their primality or compositeness.

If q is a prime number, then the procedure flow proceeds to step 150, and identifies the RSA modulus n having a predetermined leading portion s and a trailing portion which has been determined such that n is the product of the secret numbers p, q, that is, p*q=n.

If q is not a prime number, then at step 130, q is incremented by 1. Correspondingly, n is incremented by p. Generally, incrementing n changes only its least significant bits and leaves its most significant bits, i.e., the predetermined portion s, unaffected. At step 135, it is determined whether incrementing n has altered its most significant bits, namely, the predetermined portion s. If the predetermined portion s is unaltered, then flow returns to step 125 and tests whether the newly incremented q is prime. If the predetermined portion s is altered, then flow proceeds to step 140.

Another way of expressing the determination at step 135 is to view the value n as being the concatenation of the predetermined leading portion s and a trailing portion of $K/2+\ln(K/2)$ bits, with K/2 being the number of bits in the prime number p. The desired prime number q is its initially chosen value $q_0$ plus its increments $q_i$. The determination at step 135 is then expressed as whether $q_i \geq 2^k$.

At step 140, the counter i is incremented by 1. At step 145, it is determined whether the number of different p values tested so far has exceeded a threshold. If not, then flow returns to step 110 and a new value of p is selected. If the number of different p values has exceeded the threshold, then, at step 160, flow terminates without finding a solution.

The number of times q has to be incremented by 1 until it is prime is, on average, given by ln(q). This result follows from the prime number theorem, as explained in G. H. Hardy and E. M. Wright, *An Introduction to the Theory of Numbers*, Oxford Clarendon Press, 1960, page 9, the disclosure of which is hereby incorporated by reference. As a prudent programming technique, the threshold in step 145 may be set to a small integer value. For example, the threshold may be chosen as 10.

In another embodiment, if it is found that s has been altered by incrementing n, then the procedure can flow directly to step 110 to select a new p, omitting the threshold test. If, in step 110, the number p is each time properly selected as a random prime number, then the prime number theorem guarantees that the method terminates with a solution. This embodiment eliminates the possibility of termination without finding a solution, as in the earlier embodiment.

In another embodiment, if it is found that q is not prime at step 125, then the procedure can flow directly to step 110 to select a new p. If, in step 110, the number p is each time properly selected as a random prime number, then the prime number theorem guarantees that the method terminates with a solution. This embodiment generally takes longer to find an RSA modulus, but allows more bits of n to be predetermined.

In a further embodiment, at step 130, instead of incrementing q and n, q may be decremented by a predetermined amount, and n may be decremented by the product of the predetermined amount and p. Correspondingly, at step 115, the chosen number n' is rounded down to the nearest multiple of p, resulting in the rounded number n. As shown in FIG. 2, the predetermined amount may be 1. An advantage of this embodiment is that it can be used to generate RSA moduli that allow faster arithmetic operations, namely RSA moduli of the form $2^K-x$, where x is a positive integer of bit-length substantially smaller than K.

As a practical matter, modifications of the above-described technique are used to make it harder for an attacker to find out how the RSA modulus was generated, such as appending random bits to the predetermined portion s.

Another modification is to make s shorter, and add iterations until the desired portion shows up. More specifically, adding iterations until the desired portion shows up can be accomplished by letting s be the desired portion of predetermined leading bits, say of length M. Write s as the concatenation of s̄ and t, where s̄ has length M-m for some small m less than ln(M) and t has length m. Thus, s̄ consists of the leading M-m bits of s, and t consists of the m least significant bits of s. Apply the method of FIG. 2 with s̄ instead of s in step 105, and between step 120 and step 125 find the k that is closest to zero (k positive or negative), such that the leading M bits of n+kp are equal to s, rather than s̄, and replace q by q+k and n by n+kp. In step 130, use q+1 and n+p if k is positive, but use q-1 and n-p if k is negative. Use s̄, rather than s, in step 135.

It will be appreciated that the predetermined portion s may be given in any radix representation. FIGS. 1A and 2 illustrate a radix of 2, but other radices may be used.

In another variation of the above-described technique, instead of the predetermined portion s being a pattern, it can represent information, such as at least one of the name, address, account number and so on of the participant.

Figure 3:
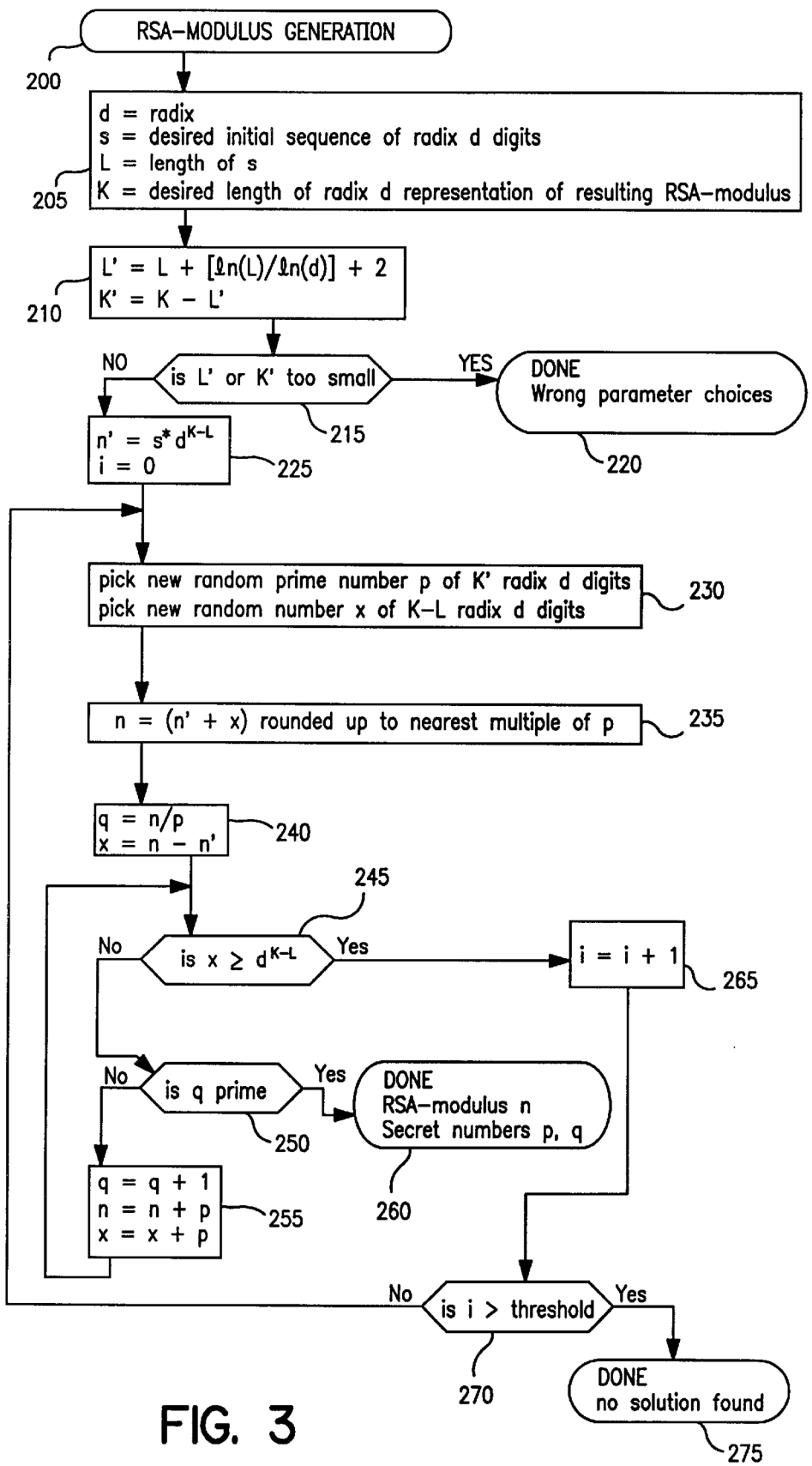

FIG. 3 is a flowchart illustrating a generalization of the method shown in FIG. 2.

At step 205, the radix d, predetermined portion s and desired length of the RSA modulus K are chosen. The variable L is set to the length of s.

At step 210, the revised length L'=L+[ln(L)/ln(d)]+2, and revised length K'=K−L' are obtained At step 215, it is checked whether either of the lengths L' and K' are too small. If either of the lengths L' and K' are too small, then at step 220, the procedure terminates as the parameters have been chosen incorrectly.

K' will be the length of the radix d representation of the prime p, L' will be the length of the radix d representation of the prime q. This implies that the value of p will be at least $d^{K'-1}$ and will be less than $d^{K'}$, $d^{K'-1} \leq p < d^{K'}$, and that the value of q will be at least $d^{L'-1}$ and will be less than $d^{L'}$, $d^{L'-1} \leq q < d^{L'}$.

An RSA modulus may be considered insecure if it has a factor less than $2^{230}$, or if the modulus has fewer than 768 bits. Thus, (1) if K' is such that $d^{K'} < 2^{230}$, which is equivalent to determining whether K'<230*ln(2)/ln(d), or (2) if L' is such that $d^{L'} < 2^{230}$, which is equivalent to determining whether L'<230*ln(2)/ln(d), or (3) if (K'+L')<767*ln(2)/ln(d), that is, the resulting RSA modulus has fewer than 768 radix d digits, then the resulting RSA modulus will be insecure, Therefore, K' and L' are wrong parameter choices if any of the aforementioned three conditions occur, because the resulting RSA modulus would be insecure. The determination at step 215 of whether L' or K' are too small corresponds to testing for any of the aforementioned three conditions.

If the lengths L' and K' are of adequate size, then at step 225, the initial RSA modulus $n'=s*d^{K-L}$ is obtained, and a counter i for the number of solution attempts is initialized to zero.

At step 230, a prime number p having K' radix d digits is randomly selected, and an intermediate value x is randomly selected, x having K–L radix d digits. The intermediate value x is keeping track of the amount by which n gets disturbed in step 255. If, at step 245, x gets too large, that is an indication that the radix d digits of the predetermined portion s in n would be affected. Thus, x is used to make it easy to formulate the equivalent, in step 245, of step 135 of FIG. 2.

At step 235, an RSA modulus n is set to n'+x, rounded up to the nearest multiple of p.

At step 240, q is set to n/p, and x is set to n−n'.

At step 245, it is checked whether $x \geq d^{K-L}$. Step 245 has the same purpose as step 135 of FIG. 2: testing whether the predetermined portion s of n has been affected. The order of steps 245 and 250 in FIG. 3 is different from the order of the corresponding steps 125 and 135 in FIG. 2, because of the slightly different way n is created in FIG. 3 compared to FIG. 2.

If $x < d^{K-L}$, then at step 250, it is checked whether q is prime; the check may be performed as described above with regard to step 125 of FIG. 2. If q is a prime number, then the procedure flow proceeds to step 260, and identifies the RSA modulus n having a predetermined leading portion s and a trailing portion which has been determined such that n is the product of the secret numbers p, q, that is, p*q=n.

If q is not a prime number, then at step 255, q is incremented by 1. Correspondingly, n is incremented by p and x is incremented by p. The procedure then returns to step 245.

If, at step 245, the result of the comparison is positive, then at step 265, the counter i is incremented. At step 270, it is determined whether i is greater than a threshold number of attempts. If so, then the procedure terminates at step 275. If not, then the procedure flow returns to step 230.

In the method illustrated in FIG. 3, the sizes of p and q do not have to be close. L and K should be chosen in such a way that the resulting L' and K', the sizes of q and p, are large enough to make the resulting RSA modulus secure, as determined in step 215.

In a variation of the method of FIG. 3, at step 255, instead of incrementing q by a predetermined amount and incrementing each of n and x by the product of the predetermined amount and p, it is possible to decrement q by a predetermined amount and to decrement each of n and x by the product of the predetermined amount and p. When decrementing at step 255, at step 235 (n'+x) is rounded down to the nearest multiple of p, and the test at step 245 becomes "is x<0".

In variations of the above-described technique, instead of having the predetermined portion s be a leading portion, the predetermined portion s can be chosen as a trailing portion of the RSA modulus n. Additionally, s can be chosen as a concatenation of the leading and trailing portions of the RSA modulus n. The Vanstone paper describes generation of an RSA modulus with a predetermined trailing portion.

FIG. 1B is a block diagram illustrating an RSA modulus n of K bits having two predetermined portions s1 and s2, each of M bits. In FIG. 1B, the predetermined portion of the RSA modulus is split between the most significant bits and least significant bits. Although FIG. 1B shows the split as even, it will be appreciated that an uneven split of the predetermined portion between most significant bits and least significant bits is also possible.

For an embodiment as in FIG. 1B, security can be enhanced by including truly random bits in the middle of the predetermined portion consisting of the concatenation of s1 and s2, that is, including random bits in the trailing portion of s1 and/or the leading portion of s2.

Figure 4:
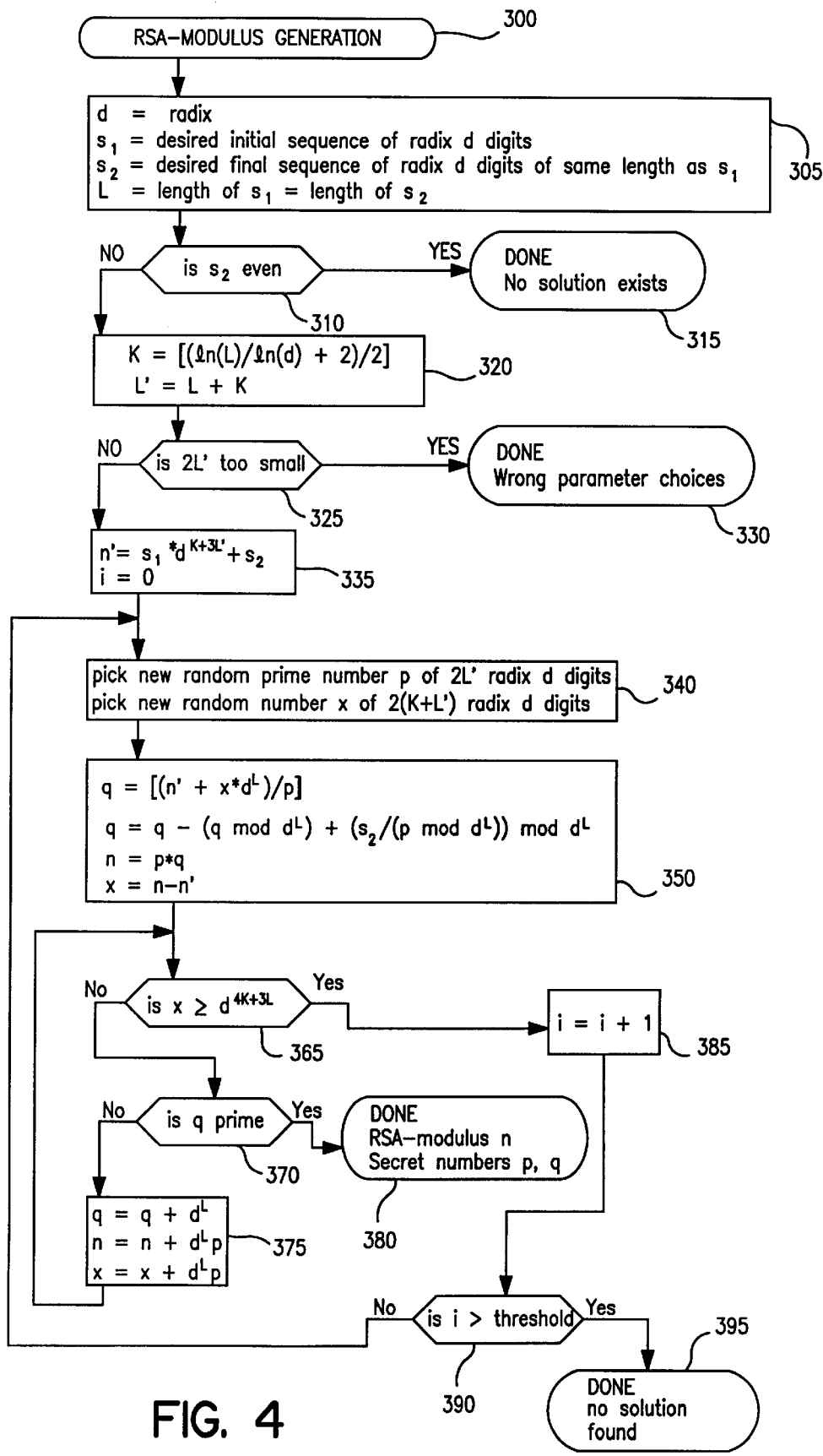

FIG. 4 is a flowchart illustrating another RSA modulus generation technique according to the present invention.

In the method of FIG. 4, let the radix d representation of s have length 2L, and let s be odd. Let $K=[(\ln(L)\ln(d)+2)/2]$ and let L' be L+K. Insert 2K zero radix d digits in the middle of s, resulting in s of 2L' radix d digits. Let p be a random prime of 2L' radix d digits. Write p as the concatenation of $p_1$ and $p_0$, where $p_1$ and $p_0$ each have L' radix d digits, with $p_0$ possibly having leading digits equal to zero. As in the method of FIG. 3, divide the top L' radix d digits of s by $p_1$ to get $q_1$. Divide the bottom L' radix d digits of s by $p_0$ mod $d^L$ to get $q_0$ of L' radix d digits, possibly with leading digits equal to zero. Let $q_1$ concatenated with $q_0$ be equal to q. Add $d^L$ to q until q is prime.

At step 305, the radix d, and predetermined initial and final portion s1 and s2 are chosen. The variable L is set to the length of s1, which is equal to the length of s2. There is no need to choose the desired length of the RSA modulus because in the method of FIG. 4, the size of the resulting RSA modulus is 4 (L+[(ln(L)/ln(d)+2)/2]), i.e., the size of the RSA modulus follows from the size of s1 and s2.

At step 310, it is checked whether s2 is even. If so, then at step 315, the procedure terminates. The last bit of the resulting RSA modulus will be equal to the last bit of s2, so evenness of s2 results in evenness of the RSA modulus, making it impossible to find primes p and q of desired length with product equal to n.

If s2 is odd, then at step 320, the length $K=[(\ln(L)/\ln(d)+2)/2]$, and revised length L'=L+K are obtained. The desired length of the RSA modulus is 4L'.

At step 325, it is checked whether the length 2L' is too small. The determination of whether 2L' is too small corresponds to determining whether either of the following conditions are true:

(1) is 2L'<230*ln(2)/ln(d), or (2) is 4L'<767*ln(2)/ln(d). If the length 2L' is too small, then at step 330, the procedure terminates as the parameters have been chosen incorrectly.

If the revised length L' is of adequate size, then at step 335, the initial RSA modulus $n'=s1*d^{K+3L'}+s2$ is obtained, and a counter i for the number of solution attempts is initialized to zero.

At step 340, a prime number p having 2L' radix d digits is randomly selected, and an intermediate value x is randomly selected, x having 2(K+L') radix d digits.

At step 350, q is first set to $[(n'+x*d^L)/p]$, and then q is set to $$q-(q \bmod d^L)+(s2/(p \bmod d^L)) \bmod d^L.$$

An RSA modulus n is set to p*q, and the intermediate value x is set to n−n'.

At step 365, it is checked whether $x \geq d^{4K+3L}$, that is, whether the radix d digits of s are affected which, in turn, would require selecting another value for p. If not, then at step 370, it is checked whether q is prime; the check may be performed as described above with regard to step 125 of FIG. 2. If q is a prime number, then the procedure flow proceeds to step 380, and identifies the RSA modulus n having predetermined leading and trailing portions s1 and s2, respectively, and a central portion which has been determined such that n is the product of the secret numbers p, q, that is, p*q=n.

If q is not a prime number, then at step 375, q is incremented by $d^L$. Correspondingly, n is incremented by the product of p and $d^L$, and x is incremented by the product of p and $d^L$. It will be recalled that the determination of step 365 is directed to whether the predetermined portion s is affected by the incrementing. The procedure then returns to step 365.

If, at step 365, the result of the comparison is positive, then at step 385, the counter i is incremented. At step 390, it is determined whether i is greater than a threshold number of attempts. If so, then the procedure terminates at step 395. If not, then the procedure flow returns to step 340.

The procedure of FIG. 4 ensures that the resulting RSA modulus includes the predetermined leading and trailing portions s1 and s2 as follows. At step 335, the initial modulus n' is set equal to the predetermined leading portion s1 shifted to the most significant radix d digits of n' due to multiplication by $d^{K+3L'}$, summed with the predetermined trailing portion s2 as the least significant radix d digits of n'.

At step 350, the modulus n is set to p*q. The modulus n includes the predetermined leading portion s1 in its most significant radix d digits since the factor q is defined so that p*q=n'+x*$d^L$. Because x has 2(K+L') radix d digits, adding x to n' does not affect the most significant radix d digits of n' which have been set to the predetermined leading portion s1. The modulus n includes the predetermined trailing portion s2 in its least significant radix d digits since q was adjusted to wipe out its $d^L$ least significant radix d digits, by subtracting q mod $d^L$, and then to have as its least significant radix d digits (s2/(p mod $d^L$)) mod $d^L$. These thus-obtained least significant radix d digits of q, when multiplied by p to produce n, result in n having least significant radix d digits of s2.

In another embodiment, at step 375, instead of incrementing q by $d^L$ and incrementing n and x by the product of $d^L$ and p, it is possible to decrement q by $d^L$ and decrement n and x by the product of $d^L$ and p. When decrementing at step 375, the test at step 365 is changed to "is x<$d^L$".

Figure 5:
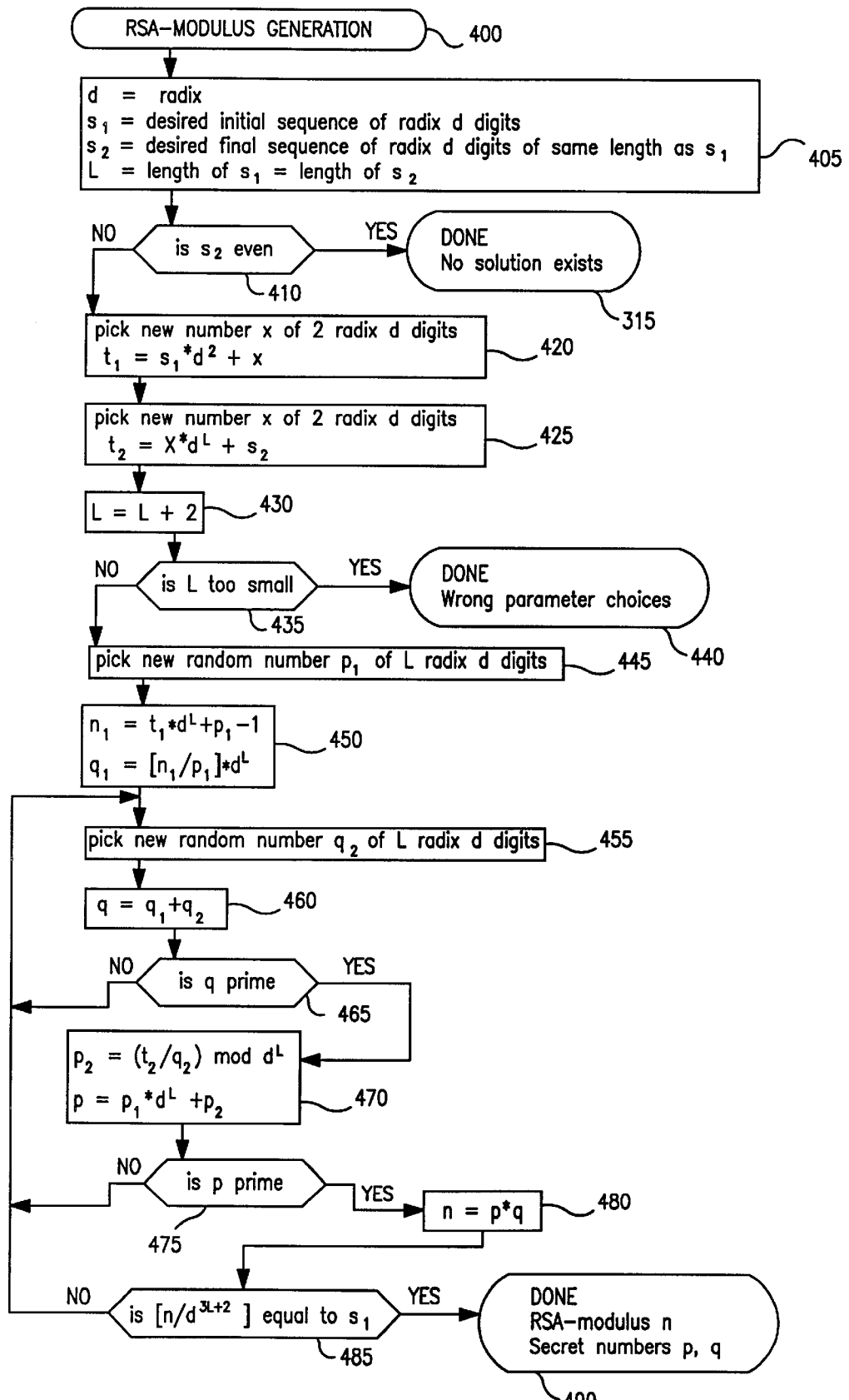

FIG. 5 is a flowchart illustrating yet another RSA modulus generation technique according to the present invention.

In the method of FIG. 5, pick $p_1$ at random, the first half radix d digits of p. As in the method of FIG. 2, divide the top half radix d digits of s by $p_1$ to get $q_1$, the top half radix d digits of q. Pick $q_0$ at random, the bottom half radix d digits of q. Divide the bottom half radix d digits of s by $q_0$ mod power of d to get $p_0$. Iterate choice of $q_0$—or add 1 to $q_0$ and adapt $p_0$ appropriately—until p, the concatenation of $p_1$ and $p_0$, and q, the concatenation of $q_1$ and $q_0$, are prime.

At step 405, the radix d, and predetermined initial and final portion s1 and s2 are chosen. The variable L is set to the length of s1, which is equal to the length of s2.

At step 410, it is checked whether s2 is even. If so, then at step 415, the procedure terminates.

If s2 is odd, then at step 420, a number x having 2 radix d digits is randomly selected, and a temporary value t1=s1*$d^2$+x is obtained.

At step 425, another number x having 2 radix d digits is randomly selected, and a temporary value t2=x*$d^2$+s2 is obtained.

It will be appreciated that the purpose of step 420 is to append a few random radix d digits to s1, resulting in t1, and that the purpose of step 425 is to prepend a few random radix d digits to s2, resulting in t2. Techniques for doing this, other than as presented in FIG. 5, will be apparent to those of ordinary skill in the art.

At step 430, the length L is incremented by two, to account for the two parts of the predetermined portion s.

At step 435, it is checked whether the length L is too small. The determination of whether L is too small corresponds to determining whether either of the following conditions are true:

(1) is 2L<230*ln(2)/ln(d), or (2) is 4L<767*ln(2)/ln(d).

If so, then at step 440, the procedure terminates as the parameters have been chosen incorrectly.

If the length L is of adequate size, then at step 445, a number p1 having L radix d digits is randomly selected. The number p1 will be the leading radix d digits of p, so it does not need to be prime.

At step 450, a number n1=t1*$d^L$+p1−1 is obtained, and a value q1=[n1/p1]*$d^L$ is obtained. The value "1" is subtracted from n1 to ensure that the most significant L radix d digits of the product p1 and q1 are equal to s1. If "1" were not subtracted, the most significant L radix d digits of the resulting RSA modulus could be equal to the radix d representation of s1+1 instead of s1.

At step 455, a new number q2 having L radix d digits is randomly selected. At step 460, q is obtained as the sum of q1 and q2.

At step 465, it is checked whether q is prime; the check may be performed as described above with regard to step 125 of FIG. 2. If q is a prime number, then at step 470, a value p2 is set to (t2/q2) mod $d^L$, and p is set to p1*$d^L$+p2.

At step 475, it is checked whether p is prime. If so, then at step 480, n is obtained as p*q.

At step 485, it is checked whether s1=[n/$d^{3L+2}$]. If so, the procedure flow proceeds to step 490, and identifies the RSA modulus n having predetermined leading and trailing portions s1 and s2, respectively, and a central portion which has been determined such that n is the product of the secret numbers p, q.

If it is not the case that s1=[n/$d^{3L+2}$] at step 485, then thee procedure flow returns to step 455.

If p is found to not be prime at step 475, then the procedure flow returns to step 455.

If q is found to not be prime at step 465, then the procedure flow returns to step 455.

In a modification, it is possible to pick p2 at step 455 and q2 in step 470, so that the method of FIG. 5 becomes similar to the method of FIG. 4 in that all digits of p are chosen, and then the digits of q follow.

In an alternate modification of FIG. 5, instead of selecting the leading digits of p, thereby determining the leading digits of q, and then the trailing digits of q, thereby determining the trailing digits of p, the order of selecting portions of p and q is reversed, i.e., first the leading digits of q, then the trailing digits of p.

An RSA modulus n generated according to the techniques of FIGS. 2–5 is then used in the same manner as RSA moduli set forth in U.S. Pat. No. 4,405,829, that is, for message encryption and decryption and for message signature generation and verification.

FIGS. 6–9 are examples of RSA moduli generated according to the present invention.

FIG. 6 illustrates generation of an RSA modulus n according to the technique shown in FIG. 3.

FIG. 7 illustrates generation of an RSA modulus n according to the technique shown in FIG. 3. The predetermined portion s of FIG. 7 depicts personal data, using an alphanumeric representation wherein "0" is 00 . . . "9" is 09, "a" is 11, "b" is 12, . . . "z" is 36.

FIG. 8 illustrates generation of an RSA modulus n according to the technique shown in FIG. 4.

FIG. 9 illustrates generation of an RSA modulus n according to the technique shown in FIG. 5.

The methods illustrated in FIGS. 2–4 are believed to be as efficient as conventional techniques for generating RSA moduli. In the methods of FIGS. 2–4, the prime p is constructed first, which requires ln(p) attempts on average, and then the prime q is constructed after an additional ln(q) attempts on average. Thus, the total amount of effort spent on FIGS. 2–4 is, on average ln(p)+ln(q) which is the same as the amount of effort spent on generation of ordinary RSA moduli.

The method illustrated in FIG. 5 is not as efficient because the primes p and q are constructed simultaneously, which requires on average ln(p)*ln(q) attempts, as one of the primes-under-test may have to be rejected because the other of the primes-under-test is not prime.

In the method of FIG. 2, allowing a smaller number of executions of step 130 per choice of p permits use of more bits for s, at the cost of, on average, more iterations for selection of p. If execution of step 130 is not allowed at all, a total of K bits may be used for s, but then the method of FIG. 2 becomes as inefficient as the method of FIG. 5.

The method of FIG. 2 can also be applied to generate primes p and q having respective approximate bits lengths L and K, as shown in FIG. 3. The test in step 215 of FIG. 3 ensures that the resulting RSA modulus will be sufficiently hard to factor using known factoring method such as the number field sieve or the elliptic curve method.

To increase an attacker's uncertainty about the size of the factors, while decreasing the amount of bits needed to represent the modulus, an s that has more than L=K/2−ln (K/2) bits may be used, given a chosen K as in FIG. 2. Let s be the desired portion of predetermined bits, say of length M=L+ln(M). Write s as the concatenation of s of length L and t of length m=ln(M). Apply the method from FIG. 2 with s instead of s in step 105, and between step 120 and step 125 find the k that is closest to zero (k positive or negative), such that the leading M bits of n+kp are equal to s, and replace q by q+k and n by n+kp. In step 130 use q+1 and n+p if k is positive, but use q−1 and n−p if k is negative. Also, use s in step 135, not s.

In the method of FIG. 2, instead of taking $n'=s*2^{K/2+k}$, rounding up and finding the smallest prime q=q'+m, take $n'=(s*2^k+2^k-1)*2^{K/2}$, round down and find the largest prime q=q'−m. This variation can be applied to the methods of FIGS. 3–5.

With the proper precautions, such as letting $n'=s*2^{K/2+k}+r$, for a random k bit number r in the method of FIG. 2, the moduli generated according to the present invention are indistinguishable from ordinary RSA keys, if s is chosen at random. But even if s is known to the attacker and consists mostly of zeros, it is believed that this knowledge would not help the attacker to factor n. If K is large and L very small, with the modulus represented by L bits only, the modulus may undesirably be within reach of the elliptic curve method. In other words, the modulus can be factored using the elliptic curve method and is thus insecure. The determination in step 215 of FIG. 3, and corresponding steps of other figures, ensures that the RSA modulus is secure.

The lengths of the factors p and q, and the length of the RSA modulus n, obtained at step 150 of FIG. 2, step 260 of FIG. 3, step 380 of FIG. 4, and step 490 of FIG. 5 may be explicitly checked to ensure these lengths are sufficiently long to provide acceptable security. Presently, a length of at least 230 bits per factor is required for the factors p and q to be considered sufficiently long to provide acceptable security, that is, to not be susceptible to an elliptic curve attack; a length of 767 bits is required for the RSA modulus n to be considered sufficiently long to provide acceptable security. However, as attackers become more sophisticated and faster processors become more commonplace, these bit lengths are expected to increase.

In the discussion above, the RSA modulus has been determined such that it has two prime factors p, q. However, the present invention is not limited to this, and can be used when the RSA modulus has more than two prime factors. In this situation; to provide sufficient security, the lengths of each of the more than two prime factors should be the same as when there are only two prime factors, that is, 230 bits.

FIGS. 10 and 11 depict examples illustrating the increase in speed that can be obtained by using RSA moduli that are close to a power of two due to the special arithmetic possible when RSA moduli according to the present invention having the form $d^K-x$, with d=2, where x has at most K/2 bits, are used. If x has substantially fewer than K bits, such as K/2 bits, then very efficient arithmetic operational possible. The operations become more efficient when x becomes smaller.

In the examples of FIGS. 10 and 11, the RSA moduli are of the form $2^K-x$, where x is a positive (K/2) bit number with K=1020 in FIG. 10 and K=2040 in FIG. 11. The RSA moduli in FIGS. 10 and 11 were generated according to the method in FIG. 3. The timing data was obtained using the same procedure as would be used when generating signatures or decrypting messages using the RSA cryptosystem: compute $a^b$ mod n for integers a and b that may be assumed to behave as random positive integers less than n, where n is the RSA modulus. For the verification of signatures or encryption of messages using the RSA cryptosystem, an exponent b would generally be used that is much smaller; however, this does not affect the relative performance of the three different types of underlying arithmetic used in the examples based on the moduli of FIGS. 10 and 11, namely, standard arithmetic, Montgomery arithmetic, and special purpose arithmetic that takes advantage of the special form of the RSA modulus n. RSA moduli of the form $d^K-x$, where x has substantially fewer than K radix d digits, allow faster arithmetic operations on a computer that uses radix d arithmetic. On most current computers d is equal to 2.

An experimental implementation of the special purpose arithmetic that takes advantage of the special form $2^K-x$ of n, for (K/2)-bit positive x, was written, and used in a function spa(a, b, n) that computes $a^b$ mod n for a, b, in {0, 1, . . . , n−1}, and n of the form $2^K-x$ for (K/2)-bit positive x. The method of FIG. 3 was used to generate a number n of the form $2^{1020}-x$ for 510-bit positive x, and 100 different pairs of integers (a,b) with a, b in {0, 1, . . . , n−1} were randomly generated. The total computing time was measured for spa(a, b, n) for this n and these 100 pairs (a,b).

In addition to the above-described function spa(a, b, n), functions sta(a, b, n) and moa(a, b, n) were written. The function sta(a, b, n) uses standard arithmetic to compute $a^b$ mod n for a, b, in {0, 1, . . . , n−1}, and n of any form. The function moa(a, b, n) uses Montgomery arithmetic to compute $a^b$ mod n for a, b, in {0, 1, . . . , n−1}, and n being an arbitrary odd number. The total computing time was measured for sta(a, b, n) and moa(a, b, n), respectively, for the same n and the same 100 pairs (a,b).

Montgomery arithmetic is explained in an article by Peter Montgomery, "Modular Multiplication Without Trial Division", in *Mathematics of Computation*, vol. 44, April 1985, pages 519–521. Montgomery arithmetic is significant because it can be used to speed up arithmetic operations modulo an odd modulus.

For a, b, in $\{0, 1, \ldots, n-1\}$, the computation of $a_b$ mod n can be performed using $|b|-1$ squarings modulo n and $w(b)-1$ multiplications modulo n, where $|b|$ denotes the bit length of b, and $w(b)$ denotes the number of "1" bits in the binary representation of b. A "squaring modulo n" is the computation of $x^2$ mod n for x in $\{0, 1, \ldots, n-1\}$. A "multiplication modulo n" is the computation of $(x*y)$ modulo n for x and y in $\{0, 1, \ldots, n-1\}$.

Figure 12:
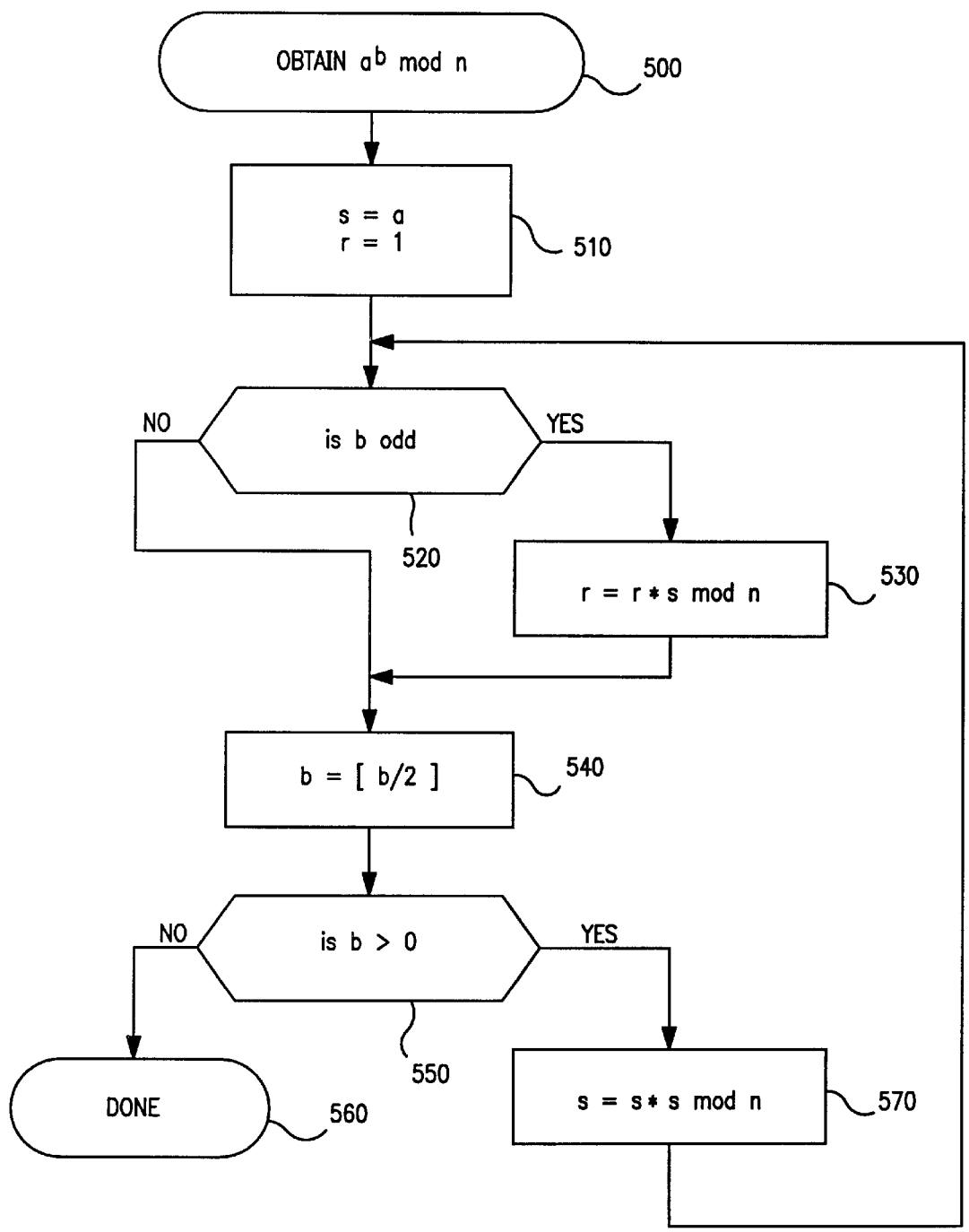
FIGS. 12 and 13 are flowcharts referred to in explaining special arithmetic according to the present invention.

FIG. 12 is a flowchart illustrating the squarings and multiplications used in a method of computing $a^b$ mod n. At step 510, the intermediate variable s is initialized to a value of "a", and the result r is initialized to a value of "1". At step 520, it is checked whether b is an odd number. Note that zero is an even number. If b is odd, the result r is set to r*s mod n, and flow proceeds to step 540. If b is determined to be even at step 520, flow proceeds directly to step 540. Step 530 comprises a multiplication modulo n.

At step 540, b is set to [b/2], the greatest integer in the quotient b/2. At step 550, it is checked whether b is greater than zero. If so, then at step 570, s is set to $s^2$ mod n, and flow returns to step 520. If b is determined to be zero at step 550, then the procedure is completed, and r represents the result $a^b$ mod n. Step 570 comprises a squaring modulo n, which can be expressed as a multiplication modulo n, specifically, as s*s modulo n. For brevity, only multiplication modulo n is described below.

A multiplication modulo n consists of two parts: a multiplication portion and a division portion. The division portion obtains the result modulo n of the multiplication portion. In special arithmetic according to the present invention, the division portion is faster than when using standard arithmetic or Montgomery arithmetic, as explained below in connection with FIG. 13.

In standard arithmetic, computation of (x*y) mod n for x and y in $\{0, 1, \ldots, n-1\}$ is as follows. Compute the regular product z=x*y. The number of bits of the product z is approximately equal to the sum of the numbers of bits of x and y, and therefore approximately twice the number of bits of n. Compute non-negative integers q and r with r<n such that z=q*n+r, using a division with remainder operation. Now, r is the desired value (x*y) mod n, and has approximately the same number of bits as n. The quotient q is worthless for the purpose of computing (x*y) mod n and is discarded. The two major steps of this procedure are the multiplication step—computing the product z=x*y—and the division step—computing the division with remainder z=q*n+r. The multiplication step is usually somewhat faster than the division step.

In Montgomery arithmetic, multiplication modulo n also consists of two stages. The first stage is identical to the multiplication step of multiplication modulo n in standard arithmetic. The second stage is different and is referred to as the reduction step, and is somewhat faster than the division step in standard arithmetic. Thus, multiplication modulo n in Montgomery arithmetic is somewhat faster than multiplication modulo n in standard arithmetic.

In special purpose arithmetic that takes advantage of the special form $d^K-x$ of n, for x of substantially fewer than K radix d digits, multiplication modulo n also consists of two stages. The first stage is identical to the multiplication step of multiplication modulo n in standard arithmetic. The second stage is identical to the division step of multiplication modulo n in standard arithmetic, with an important difference: the division with remainder computation z=q*n+r is carried out in substantially less than the standard time because the special form of n having the smaller x, with $n=d^K-x$, corresponds to faster division. Also, the computation of q and the low-level division operations are entirely avoided; all that is needed for computation of r in this case are low-level multiplication and addition operations. No low-level division operations are required.

Figure 13:
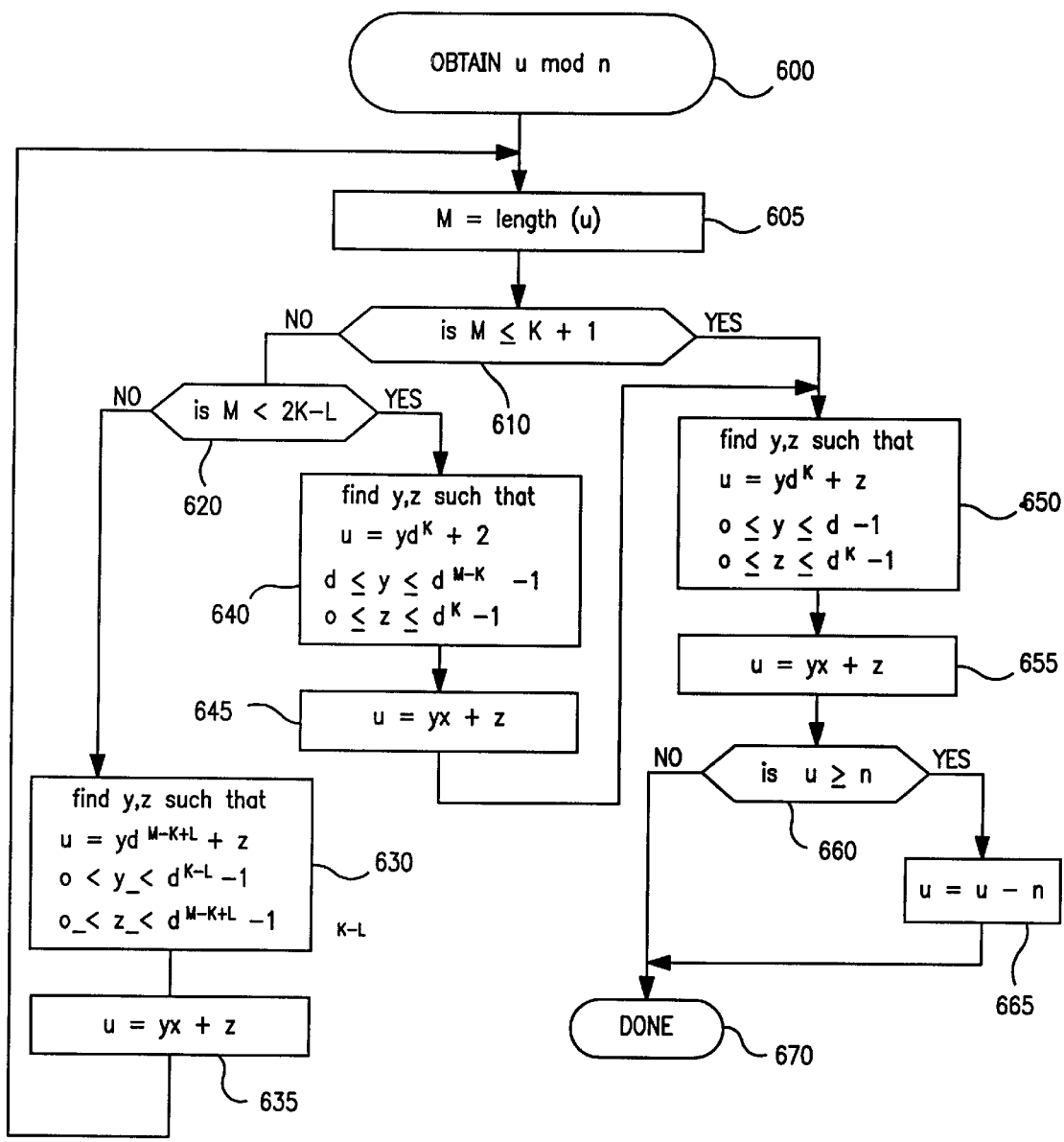

FIG. 13 illustrates a technique for a division portion according to the present invention of a multiplication modulo n, such as step 530 of FIG. 12, in which u=r*s, that is, u represents the result of the multiplication portion of the multiplication modulo n.

The relationship between digits and length will now be discussed. Any $t \in Z_{>0}$ can be uniquely written as $\Sigma_{0 \leq i < S} t_i d^i$ with $t_i, S \in Z$, $0 \leq t_i < d$, and $t_{S-1} \neq 0$. The $t_i$ are referred to as the digits of t and the number S is referred to as the length of t. The length of t=0 is defined as 1, with a single digit equal to zero. If d=2, then a digit is the same as a bit.

FIG. 1C shows the notation for lengths of a modulus which are used in the following discussion of special arithmetic according to the present invention. Assume a modulus n can be written as $\pm d^K \pm x$ for some K>0 and non-negative x of length L radix d digits, with L<K-1. If x=0, then $n=\pm d^K$; since division with remainder by any power of d is, by choice of d, a trivial operation not requiring a substantial amount of runtime, computation of a remainder modulo $n=\pm d^K$ is also a trivial operation. The case x=0 is therefore trivial. In the following discussion, it is assumed that x is positive and non-zero.

If n is of the form $d^K+x$, then n has a length of K+1, and has K+1 radix d digits. If n is of the form $d^K-x$, then, since x is non-zero, n has a length of K, and has K radix d digits. The discussion below is directed to the remainder modulo n operation for n of the form $d^K-x$.

The radix d is such that division with remainder by any non-negative power of d is considered to be a free operation, that is, given any integer m, $m \in Z$, and non-negative integer t, $t \in Z_{\geq 0}$, the computation of q, $r \in Z$, $0 \leq r < |d^t|$, such that $m=qd^t+r$, does not require further computation to obtain q and r. On most computer and software packages for extended precision arithmetic, the radix d is 2 or a positive power thereof. However, d is not limited to this, and may be 10 or any other value larger than one.

There are three ranges for the length of u which are important in special arithmetic according to the present invention. First, if the length M of u is much larger than the length of the modulus, such as $M \geq 2K-L$, then a substantial speed increase is the division portion of a multiplication modulo n is obtained by repeatedly chopping radix d digits from u, in chunks of K–L digits at a time. Second, if the length of u is approximately the same as the length of the modulus n, such as $M \leq K+1$, then possibly at most one digit can be chopped from u. Third, if the length of u is between these amounts, that is, $K+1<M<2K-L$, then an amount between one and K–L digits can be chopped from u.

In FIG. 13, at step 605, the length M of the number u is obtained. At step 610, it is checked whether $M \leq K+1$. If not, then the flow proceeds to step 620, and checks whether $M<2K-L$. If not, then the flow proceeds to step 630.

At step 630, the leading K–L digits of u are extracted. Specifically, y and z are determined such that $u=yd^{M-K+L}+z$, with $0<y \leq d^{K-L}-1$, and $0 \leq z \leq d^{M-K+L}-1$. At step 635, u is set to yx+z. It will be recalled that $n=d^K-x$. Step 635 corresponds to a large improvement over standard arithmetic and Montgomery arithmetic because the length of u decreases by at least K–L–1 digits. After step 635, flow returns to step 605. Iteration through steps 630 and 635 occurs at most [(M−K−1)/(K−L−1)] times, with M being the original length of u.

If, at step 610, it is determined that M≦K+1, then at step 650, the appropriate leading digits of u are extracted, with u=yd$^K$+z, with 0≦y≦d−1, and 0≦z≦d$^K$−1. At step 655, u is set to yx+z. At step 660, it is checked whether u≧n. If so, then at step 665, u is set to u−n, and the procedure is complete. If the determination at step 660 is negative, then the procedure is complete.

If it is determined that M>K+1 at step 610, and it is determined that M<2K−L at step 620, then at step 640, the appropriate leading digits of u are extracted, with u=yd$^K$30 z, with d≦y≦d$^{M-K}$−1, and 0≦z≦d$^K$−1. At step 645, u is set to yx+z. Flow then proceeds to step 650.

As noted, the iteration of steps 630 and 635 occurs at most [(M−K−1)/(K−L−1)] times. At each iteration, the cost of obtaining y*x, where y has K−L digits and x has L digits is (K−L)(L) if standard multiplication is used (as opposed to Karatsuba multiplication). The cost of performing the division portion of a multiplication modulo n using special arithmetic according to the present invention is, approximately $$[(M-K-1)/(K-L-1)]*(K-L)*L$$

Since (K−L−1)≈(K−1), and (M−K−1)≈M, this expression reduces to M*L. In contrast, in standard arithmetic and Montgomery arithmetic, the cost of performing the division portion of a multiplication modulo n is approximately $$[M-K]*1*K$$

Since (M−K)≈M, this expression reduces to M*K. For moduli that are generated to take advantage of this performance improvement, L is much smaller than K, hence performance improvement is obtained with special arithmetic according to the present invention relative to standard arithmetic and Montgomery arithmetic. In units of relative execution time, the performance of a multiplication modulo n is approximately as shown in Table 1.

TABLE 1

|  | Standard arithmetic | Montgomery arithmetic | Special arithmetic |
| --- | --- | --- | --- |
| multiplication portion | 50 | 50 | 50 |
| division portion | 70 | 50 | 20 |
| total | 120 | 100 | 70 |

In Table 1, the division portion shows an approximately three-fold speed up in going from standard arithmetic to special arithmetic, that is, 70/20≈3, corresponding to L≈K/3. If L≈K/4, an approximate four-fold speed up is obtained in the division portion.

A further performance improvement, i.e., reduction in execution time, can be obtained if Karatsuba arithmetic is used at step 635 of FIG. 13. Standard arithmetic and Montgomery arithmetic cannot use Karatsuba arithmetic in the division portion of a multiplication modulo n, as division operations are required in each of these cases, whereas in the present invention, the modulus is guaranteed to be in a form suitable for use with Karatsuba arithmetic and division operations are not required, as shown in step 635 of FIG. 13.

Let $m_1 = q_1 d^M + r_1$ and $m_2 = q_2 d^M + r_2$, with $q_1, q_2, r_1, r_2 < 2^M$, and the length of each of $m_1, m_2$ being 2M digits. In standard arithmetic, the computation of $m_1*m_2$ requires $(2M)^2$ operations, that is $4M^2$ operations. In Karatsuba arithmetic, $m_1*m_2$ is expressed as $$(q_1 d^M + r_1)*(q_2 d^M + r_2) = (q_1 q_2)d^{2M} + (q_1 r_2 + r_1 q_2)d^{1M} + (r_1 r_2)d^{0M}$$

The computation of each of the coefficients of the $d^{iM}$ terms, i=0, 1, 2, requires $M^2$ operations, for a total of $3M^2$ operations, which is about 25% faster than the $4M^2$ operations required in standard arithmetic. In units of relative execution time, the performance of a multiplication modulo n is approximately as shown in Table 2, using Karatsuba multiplication. Recursive application of Karatsuba multiplication may reduce the execution time even further.

TABLE 2

|  | Standard arithmetic | Montgomery arithmetic | Special arithmetic |
| --- | --- | --- | --- |
| multiplication portion, with Karatsuba | 30 | 30 | 30 |
| division portion, with Karatsuba where possible | 70 | 50 | 15 |
| total | 100 | 80 | 45 |

For the example in FIG. 10, computation of $a^b$ mod n, in which n is of the form $2^{1020}$−x, for 100 different randomly picked (a, b) pairs in {0, 1, . . . , n−1} took 213.846 seconds using the experimental implementation of the arithmetic that takes advantage of the special form of n. Using standard arithmetic, the same computation took 309.451 seconds. Using Montgomery arithmetic, the same computation took 269.615 seconds. Thus, for 1020-bit n, a 30.9% improvement was achieved over standard arithmetic, and a 20.7% improvement was achieved over Montgomery arithmetic.

For the example in FIG. 11, computation of $a^b$ mod n, in which n is of the form $2^{2040}$−x, rather than $2^{1020}$−x, for 100 different randomly picked (a, b) pairs in {0, 1, . . . , n−1} took 1303.956 seconds using the experimental implementation of the arithmetic that takes advantage of the special form of n. Using standard arithmetic, the same computation took 2132.418 seconds. Using Montgomery arithmetic, the same computation took 1862.088 seconds. Thus, for 2040-bit n, a 38.8% improvement was achieved over standard arithmetic, and a 30.0% improvement was achieved over Montgomery arithmetic.

For RSA moduli of the form $2^K$−x with x a positive (K/2)-bit integer, special purpose arithmetic that takes advantage of the special form of n achieves a speed-up of up to 40% as K gets very large. This is substantiated by the timings: 31% was obtained for K=1020, 39% was obtained for K=2040, and the speed-up gets closer to 40% for even larger K. For RSA moduli of the form $2^K$−x with smaller, but positive, x more substantial speed-ups are obtained, with the actual percentage speed-up depending on the specifics of the implementation.

The method developed by Coppersmith in his 1996 article can only be applied to factor an RSA modulus n if at least $(\log_2(n))/4$ high order bits of one of the factors of n are known. In contrast, in the present invention, all bits of the first factor are chosen at random and are therefore unknown. The high order bits of the other factor are a function of the RSA modulus and the first factor. Because the first factor has random high order bits, the high order bits of the other factor also behave as random bits. Consequently, the method developed by Coppersmith does not apply to the present invention.

Vanstone and Zuccherato describe, in section 7 at page 108 of their paper, a technique for RSA modulus generation with the modulus having predetermined least significant bits. A random prime number p having K/2 bits is selected. Let $q'=s/p \bmod 2^{K/2}$. Change the top k bits, $k=\ln(K/2)$, of q' until q' is prime, and call the altered result q. If impossible, start over. If possible, then n=p*q and $s \equiv n \bmod 2^{K/2+k}$. For the reasons given above, the method developed by Coppersmith does not apply to this particular technique in the Vanstone paper, although it applies to other techniques in the Vanstone paper.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A cryptographic communication system for performing a cryptographic function such as encryption, decryption, or signing messages using an RSA modulus formed by a predetermined leading portion s, first and second factors p and q, comprising:
   a memory device; and
   a processor disposed in communication with the memory device, the processor configured to:
   select a number p;
   set a number n' having the predetermined leading portion s;
   obtain the factor q as n'/p;
   check whether the factor q is prime;
   if the factor q is prime, compute the number n as the product of p and q and determine that the number n is the RSA modulus; and
   if the factor q is not prime, adjust q and repeat the check of whether the factor q is prime.

2. The system of claim 1, the processor further configured to:
   modify the initial number n' by rounding its value up to a multiple of the number p.

3. The system of claim 1, wherein to adjust the factor q, the processor is further configured to:
   increment the factor q by a predetermined amount.

4. The system of claim 3, wherein to adjust the factor q, the processor is further configured to:
   increment the number n' by the product of the predetermined amount and the number p.

5. The system of claim 4, the processor further configured to:
   check whether the incremented number n' contains the predetermined leading portion s.

6. The system of claim 1, the processor further configured to:
   modify the initial number n' by rounding its value down to a multiple of the number p.

7. The system of claim 1, wherein to adjust the factor q, the processor is further configured to:
   decrement the factor q by a predetermined amount.

8. The system of claim 7, wherein to adjust the factor q, the processor is further configured to:
   decrement the number n' by the product of the predetermined amount and the number p.

9. The system of claim 8, the processor further configured to:
   check whether the decremented number n' contains the predetermined leading portion s.

10. The system of claim 1, wherein the factor p is a prime number.

11. The system of claim 1, wherein the factor p is a product of prime numbers.

12. The system of claim 1, the processor further configured to:
    check whether the lengths of the factors of the RSA modulus are sufficiently long to provide acceptable security.

13. The system of claim 1, the processor further configured to:
    check whether the length of the RSA modulus is sufficiently long to provide acceptable security.

14. The system of claim 1, wherein the cryptographic function is to generate an encrypted message.

15. The system of claim 1, wherein the cryptographic function is to generate a decrypted message.

16. The system of claim 1, wherein the cryptographic function is to generate a signed message.

17. The system of claim 1, wherein the cryptographic function is to generate a verified signature.

18. A cryptographic communication system for performing a cryptographic function such as encryption, decryption, or signing messages using an RSA modulus formed by a predetermined leading portion s1 and predetermined trailing portion s2, and first and second factors p and q, comprising:
    a memory device; and
    a processor disposed in communication with the memory device, the processor configured to:
    select a number p;
    set a number n' having the predetermined leading portion s1 and predetermined trailing portion s2;
    obtain the factor q as n'/p;
    check whether the factor q is prime;
    if the factor q is prime, compute the number n as the product of p and q and determine that the number n is the RSA modulus; and
    if the factor q is not prime, adjust q and repeat the check of whether the factor q is prime.

19. The system of claim 18, wherein the factor p is a prime number.

20. The system of claim 18, wherein the factor p is a product of prime numbers.

21. The system of claim 18, the processor further configured to:
    check whether the lengths of the factors of the RSA modulus are sufficiently long to provide acceptable security.

22. The system of claim 18, the processor further configured to:
    check whether the length of the RSA modulus is sufficiently long to provide acceptable security.

23. The system of claim 18, wherein to obtain the factor q, the processor is further configured to:
    adjust the factor q so that its least significant bits, when multiplied by the number p, will be the predetermined trailing portion s2.

24. The system of claim 18, wherein to adjust the factor q, the processor is further configured to:
    increment the factor q by a predetermined amount.

25. The system of claim 24, wherein to adjust the factor q, the processor is further configured to:

increment the number n' by the product of the predetermined amount and the number p.

26. The system of claim 25, the processor is further configured to:
check whether the incremented number n' contains the predetermined leading portion s1.

27. The system of claim 18, wherein to adjust the factor q, the processor is further configured to:
decrement the factor q by a predetermined amount.

28. The system of claim 27, wherein to adjust the factor q, the processor is further configured to:
decrement the number n' by the product of the predetermined amount and the number p.

29. The system of claim 28, the processor further configured to:
check whether the decremented number n' contains the predetermined leading portion s1.

30. The system of claim 18, wherein the cryptographic function is to generate an encrypted message.

31. The system of claim 18, wherein the cryptographic function is to generate a decrypted message.

32. The system of claim 18, wherein the cryptographic function is to generate a signed message.

33. The system of claim 18, wherein the cryptographic function is to generate a verified message.

34. A cryptographic communication system for performing a cryptographic function such as encryption, decryption, or signing messages using an RSA modulus formed by a predetermined leading portion s1 and a predetermined trailing portion s2, and first and second factors p and q, comprising:
a memory device; and
a processor disposed in communication with the memory device, the processor configured to:
(a) pick p1 or q1;
(b) set a number n1 having the predetermined leading portion s1 and a trailing portion which is a function of the selected one of p1 and q1;
(c) obtain the other of p1 and q1 as the number n1 divided by the selected one of p1 and q1;
(d) pick p2 or q2;
(e) obtain the other of p2 and q2 as the predetermined trailing portion s2 divided by the selected one of p2 and q2;
(f) concatenate p1 and p2 to produce the factor p;
(g) concatenate q1 and q2 to produce the factor q;
(h) check whether each of the factors p and q are prime;
(i) if each of the factors p and q are prime, determine that the RSA modulus is the product of the factors p and q; and
(j) if at least one of the factors p and q is not prime, repeat steps (d)–(i).

35. The system of claim 34, the processor further configured to:
check whether the lengths of the factors of the RSA modulus are sufficiently long to provide acceptable security.

36. The system of claim 34, the processor further configured to:
check whether the length of the RSA modulus is sufficiently long to provide acceptable security.

37. The system of claim 34, wherein the lengths of the predetermined leading portion s1, the predetermined trailing portion s2, the number p1, and the number q2 are equal.

38. The system of claim 34, wherein the cryptographic function is to generate an encrypted message.

39. The system of claim 34, wherein the cryptographic function is to generate a decrypted message.

40. The system of claim 34, wherein the cryptographic function is to generate a signed message.

41. The system of claim 34, wherein the cryptographic function is to generate a verified signature.

42. A cryptographic communication computer program product for performing a cryptographic function such as encryption, decryption, or signing messages using an RSA modulus formed by a predetermined leading portion s, first and second factors p and q, comprising the steps of:
a computer readable medium;
program code in said computer readable medium for selecting a number p;
program code in said computer readable medium for setting a number n' having the predetermined leading portion s;
program code in said computer readable medium for obtaining the factor q as n'/p;
program code in said computer readable medium for checking whether the factor q is prime;
if the factor q is prime, program code in said computer readable medium for computing the number n as the product of p and q and determining that the number n is the RSA modulus; and
if the factor q is not prime, program code in said computer readable medium for adjusting q and repeating the step of checking.

43. The computer program product of claim 42, further comprising:
program code in said computer readable medium for modifying the initial number n' by rounding its value up to a multiple of the number p.

44. The computer program product of claim 42, wherein the program code in said computer readable medium for adjusting the factor q further comprises:
program code in said computer readable medium for incrementing the factor q by a predetermined amount.

45. The computer program product of claim 44, wherein the program code in said computer readable medium for adjusting the factor q further comprises:
program code in said computer readable medium for incrementing the number n' by the product of the predetermined amount and the number p.

46. The computer program product of claim 45, further comprising:
program code in said computer readable medium for checking whether the incremented number n' contains the predetermined leading portion s.

47. The computer program product of claim 42, further comprising:
program code in said computer readable medium for modifying the initial number n' by rounding its value down to a multiple of the number p.

48. The computer program product of claim 42, wherein the program code in said computer readable medium for adjusting the factor q further comprises:
program code in said computer readable medium for decrementing the factor q by a predetermined amount.

49. The computer program product of claim 48, wherein the program code in said computer readable medium for adjusting the factor q further comprises:
program code in said computer readable medium for decrementing the number n' by the product of the predetermined amount and the number p.

50. The computer program product of claim 49, further comprising:
program code in said computer readable medium for checking whether the decremented number n' contains the predetermined leading portion s.

51. The computer program product of claim 42, wherein the factor p is a prime number.

52. The computer program product of claim 42, wherein the factor p is a product of prime numbers.

53. The computer program product of claim 42, further comprising:
program code in said computer readable medium for checking whether the lengths of the factors of the RSA modulus are sufficiently long to provide acceptable security.

54. The computer program product of claim 42, further comprising:
program code in said computer readable medium for checking whether the length of the RSA modulus is sufficiently long to provide acceptable security.

55. The computer program product of claim 42, wherein the cryptographic function is to generate an encrypted message.

56. The computer program product of claim 42, wherein the cryptographic function is to generate a decrypted message.

57. The computer program product of claim 42, wherein the cryptographic function is to generate a signed message.

58. The computer program product of claim 42, wherein the cryptographic function is to generate a verified signature.

59. A cryptographic communications computer program product for performing a cryptographic function such as encryption, decryption, or signing messages using an RSA modulus formed by a predetermined leading portion s1 and predetermined trailing portion s2, and first and second factors p and q, comprising:
a computer readable medium;
program code in said computer readable medium for selecting a number p;
program code in said computer readable medium for setting a number n' having the predetermined leading portion s1 and predetermined trailing portion s2;
program code in said computer readable medium for obtaining the factor q as n'/p;
program code in said computer readable medium for checking whether the factor q is prime;
if the factor q is prime, program code in said computer readable medium for computing the number n as the product of p and q and determining that the number n is the RSA modulus; and
if the factor q is not prime, program code in said computer readable medium for adjusting q and repeating the step of checking.

60. The computer program product of claim 59, wherein the factor p is a prime number.

61. The computer program product of claim 59, wherein the factor p is a product of prime numbers.

62. The computer program product of claim 59, further comprising:
program code in said computer readable medium for checking whether the lengths of the factors of the RSA modulus are sufficiently long to provide acceptable security.

63. The computer program product of claim 59, further comprising:

program code in said computer readable medium for checking whether the length of the RSA modulus is sufficiently long to provide acceptable security.

64. The computer program product of claim 59, wherein the program code in said computer readable medium for obtaining the factor q further comprises:
program code in said computer readable medium for adjusting the factor q so that its least significant bits, when multiplied by the number p, will be the predetermined trailing portion s2.

65. The computer program product of claim 59, wherein the program code in said computer readable medium for adjusting the factor q further comprises:
program code in said computer readable medium for incrementing the factor q by a predetermined amount.

66. The computer program product of claim 65, wherein the program code in said computer readable medium for adjusting the factor q further comprises:
program code in said computer readable medium for incrementing the number n' by the product of the predetermined amount and the number p.

67. The computer program product of claim 66, further comprising:
program code in said computer readable medium for checking whether the incremented number n' contains the predetermined leading portion s1.

68. The computer program product of claim 59, wherein the program code in said computer readable medium for adjusting the factor q further comprises:
program code in said computer readable medium for decrementing the factor q by a predetermined amount.

69. The computer program product of claim 68, wherein the program code in said computer readable medium for adjusting the factor q further comprises:
program code in said computer readable medium for decrementing the number n' by the product of the predetermined amount and the number p.

70. The computer program product of claim 69, further comprising:
program code in said computer readable medium for checking whether the decremented number n' contains the predetermined leading portion s1.

71. The computer program product of claim 59, wherein the cryptographic function is to generate an encrypted message.

72. The computer program product of claim 59, wherein the cryptographic function is to generate a decrypted message.

73. The computer program product of claim 59, wherein the cryptographic function is to generate a signed message.

74. The computer program product of claim 59, wherein the cryptographic function is to generate a verified message.

75. A cryptographic communication computer program product for performing a cryptographic function such as encryption, decryption, or signing messages using an RSA modulus formed by a predetermined leading portion s1 and a predetermined trailing portion s2, and first and second factors p and q, comprising:
a computer readable medium;
(a) program code in said computer readable medium for picking p1 or q1;
(b) program code in said computer readable medium for setting a number n1 having the predetermined leading portion s1 and a trailing portion which is a function of the selected one of p1 and q1;
(c) program code in said computer readable medium for obtaining the other of p1 and q1 as the number n1 divided by the selected one of p1 and q1;

(d) program code in said computer readable medium for picking p2 or q2;

(e) program code in said computer readable medium for obtaining the other of p2 and q2 as the predetermined trailing portion s2 divided by the selected one of p2 and q2;

(f) program code in said computer readable medium for concatenating p1 and p2 to produce the factor p;

(g) program code in said computer readable medium for concatenating q1 and q2 to produce the factor q;

(h) program code in said computer readable medium for checking whether each of the factors p and q are prime;

(i) if each of the factors p and q are prime, program code in said computer readable medium for determining that the RSA modulus is the product of the factors p and q; and (j) if at least one of the factors p and q is not prime, program code in said computer readable medium for repeating steps (d)–(i).

76. The computer program product of claim 75, further comprising:

program code in said computer readable medium for checking whether the lengths of the factors of the RSA modulus are sufficiently long to provide acceptable security.

77. The computer program product of claim 75, further comprising:

program code in said computer readable medium for checking whether the length of the RSA modulus is sufficiently long to provide acceptable security.

78. The computer program product of claim 75, wherein the lengths of the predetermined leading portion s1, the predetermined trailing portion s2, the number p1 and the number q2 are equal.

79. The computer program product of claim 75, wherein the cryptographic function is to generate an encrypted message.

80. The computer program product of claim 75, wherein the cryptographic function is to generate a decrypted message.

81. The computer program product of claim 75, wherein the cryptographic function is to generate a signed message.

82. The computer program product of claim 75, wherein the cryptographic function is to generate a verified signature.

* * * * *